US012609630B2

(12) United States Patent
Mabuchi et al.

(10) Patent No.: US 12,609,630 B2
(45) Date of Patent: Apr. 21, 2026

(54) POWER CONVERTER DEVICE

(71) Applicant: HITACHI, LTD., Tokyo (JP)

(72) Inventors: Yuuichi Mabuchi, Tokyo (JP); Akihiko Kanouda, Tokyo (JP); Kimihisa Furukawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 179 days.

(21) Appl. No.: 18/681,166

(22) PCT Filed: Jul. 22, 2022

(86) PCT No.: PCT/JP2022/028536
§ 371 (c)(1),
(2) Date: Feb. 5, 2024

(87) PCT Pub. No.: WO2023/021933
PCT Pub. Date: Feb. 23, 2023

(65) Prior Publication Data
US 2024/0283371 A1    Aug. 22, 2024

(30) Foreign Application Priority Data
Aug. 17, 2021    (JP) ................................. 2021-132755

(51) Int. Cl.
*H02M 7/00* (2006.01)
*H02M 1/00* (2006.01)
(Continued)

(52) U.S. Cl.
CPC ........... *H02M 7/003* (2013.01); *H02M 1/007* (2021.05); *H02M 3/003* (2021.05); *H02M 7/68* (2013.01); *H02M 3/22* (2013.01); *H02M 3/33584* (2013.01)

(58) Field of Classification Search
CPC ........ H02M 1/007; H02M 3/003; H02M 3/22; H02M 3/335; H02M 3/33507; H02M 3/33584; H02M 7/003; H02M 7/68
See application file for complete search history.

(56) References Cited

U.S. PATENT DOCUMENTS

2014/0126263 A1*    5/2014   Koyano ................ H02M 5/293
                                                            363/148
2019/0296527 A1    9/2019   Jung
(Continued)

FOREIGN PATENT DOCUMENTS

CN         209767375 U      12/2019
JP         2004357436 A  *  12/2004
(Continued)

OTHER PUBLICATIONS

International Search Report of PCT/JP2022/028536 dated Oct. 11, 2022.

*Primary Examiner* — Thienvu V Tran
*Assistant Examiner* — Shahzeb K Ahmad
(74) *Attorney, Agent, or Firm* — MATTINGLY & MALUR, PC

(57) ABSTRACT

Provided is a power converter device that can be properly configured. The power converter device is provided with: a plurality of power conversion units each comprising a pair of AC terminals, a pair of DC terminals, and a power conversion circuit for performing power conversion in one direction or in both directions between the AC terminals and the DC terminals and arranged along a first direction and a second direction different from the first direction; AC wiring for connecting the AC terminals of the plurality of power conversion units in series along the second direction with respect to each phase of three-phase AC; and DC wiring for
(Continued)

connecting the DC terminals of the plurality of power conversion units in parallel along the first direction.

1 Claim, 4 Drawing Sheets

(51) Int. Cl.
    *H02M 3/00*        (2006.01)
    *H02M 7/68*        (2006.01)
    *H02M 3/22*        (2006.01)
    *H02M 3/335*      (2006.01)

(56)              References Cited

U.S. PATENT DOCUMENTS

2020/0113093 A1    4/2020   Nakabayashi et al.
2020/0412291 A1*  12/2020  Matsuda ................. H02P 27/06

FOREIGN PATENT DOCUMENTS

JP          2018-170832 A    3/2017
WO        2019/003432 A1    1/2019

* cited by examiner

[FIG. 1]
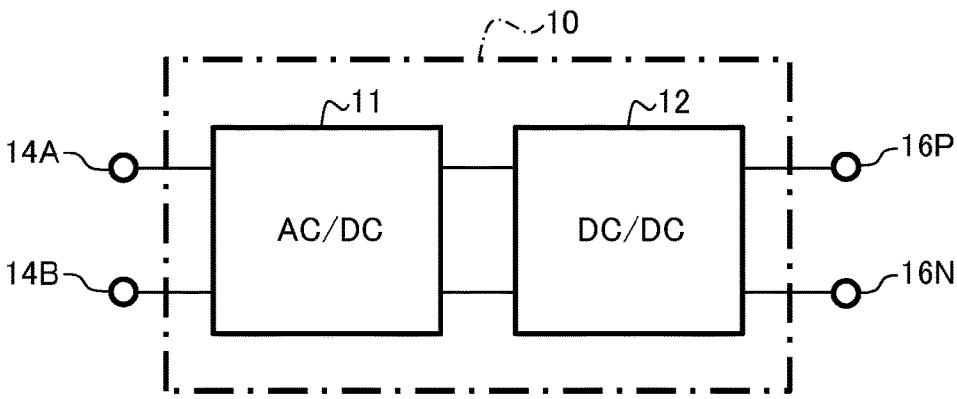
[FIG. 2]
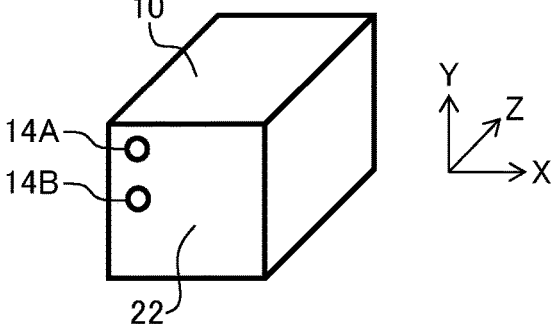
[FIG. 3]
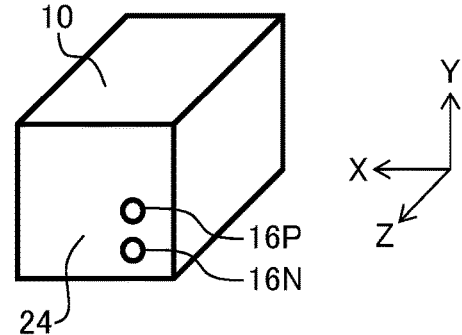

[FIG. 4]
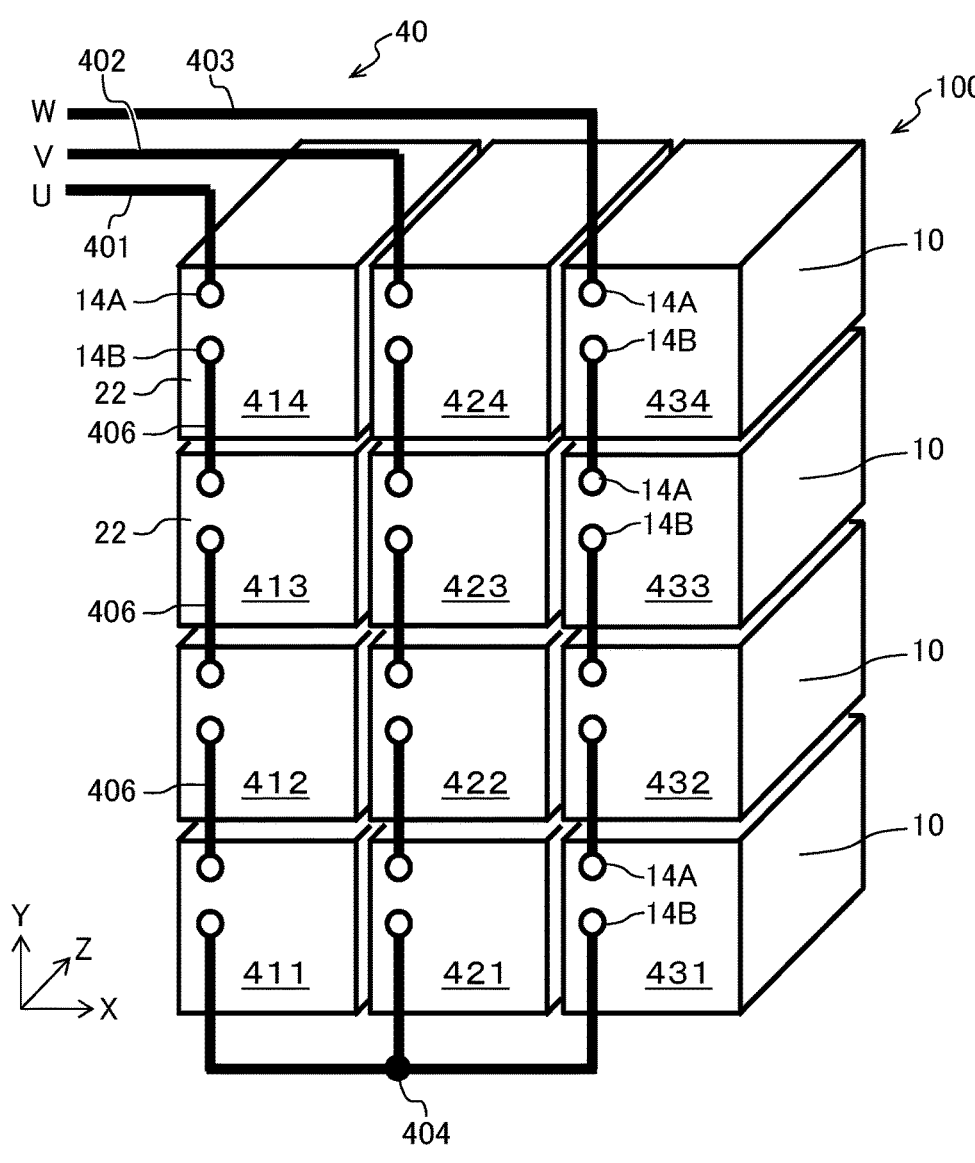

[FIG. 5]
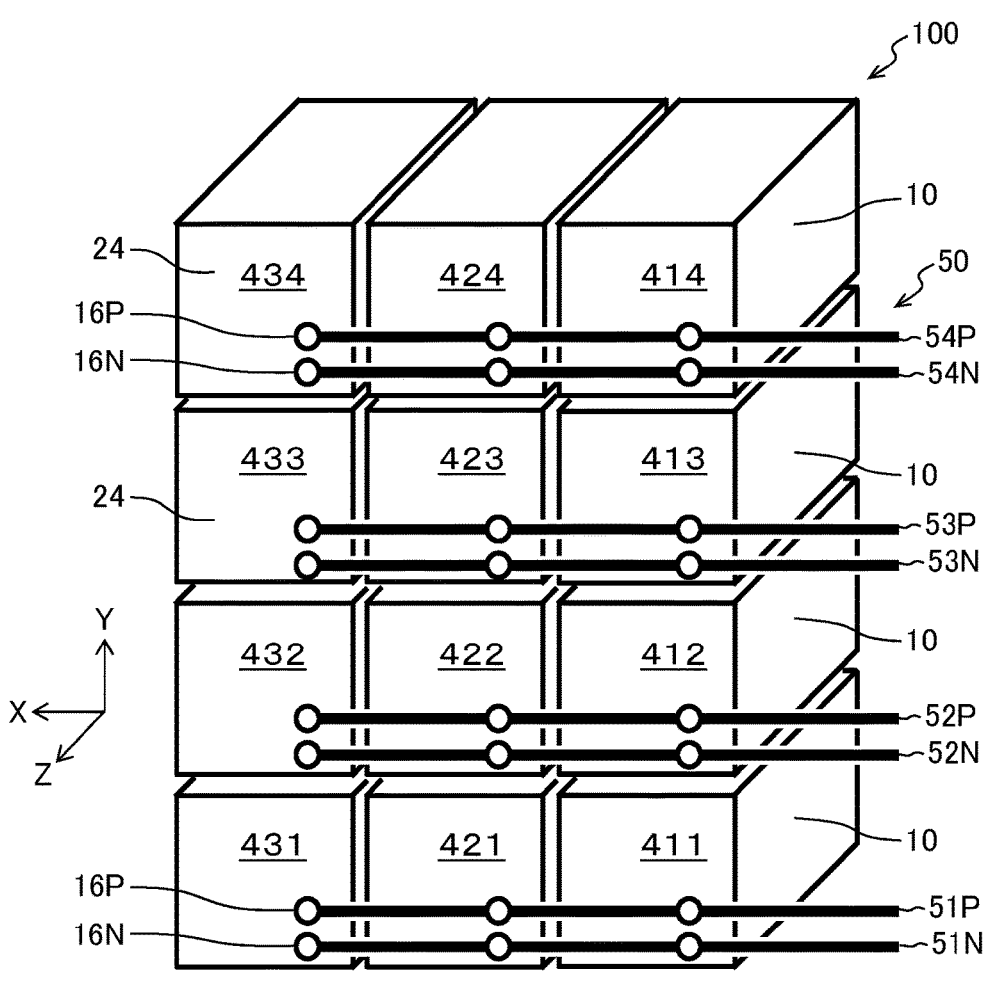

[FIG. 6]
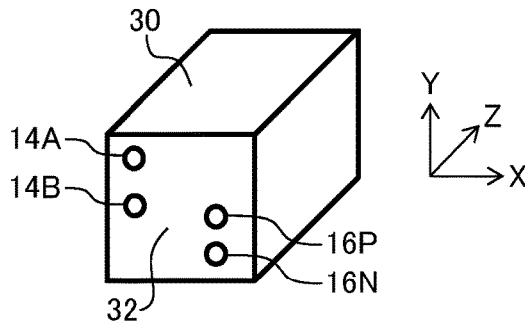
[FIG. 7]
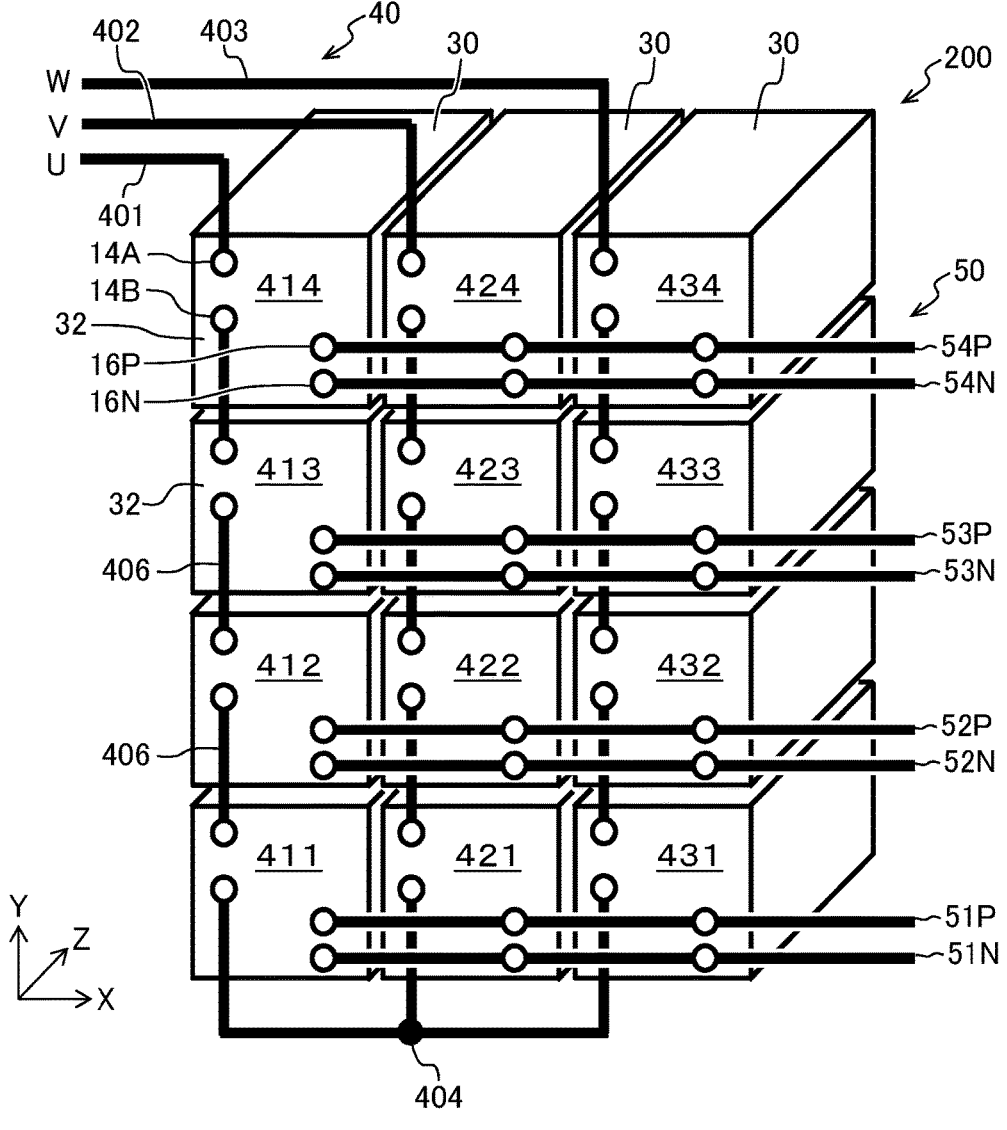

POWER CONVERTER DEVICE

TECHNICAL FIELD

The present invention relates to a power converter device.

BACKGROUND ART

As a background art of the present technical field, the following abstract of the PTL 1 describes "An input transformer 1 having a plurality of secondary windings, a transformer panel 10 that houses the input transformer 1, a three-phase inverter in which phases from a plurality of unit inverters 2 that are connected to the secondary windings on a one-to-one basis and that output a single-phase AC voltage of a desired frequency are connected in series are connected in Y-connection, and a converter panel 20 that houses the unit inverters 2 constituting the three-phase inverter are provided, wherein the converter panel 20 includes a plurality of columns 22 made of insulator and a plurality of metal shelf plates 23 that laterally fasten adjacent columns of the plurality of columns 22, and the unit inverters 2 are respectively placed and fixed on the shelf plates 23.".

Further, the following abstract of PTL 2 describes that "A power conversion device according to an embodiment includes: a power converter including a leg having a plurality of unit converters that are connected in series and that charge and discharge respective capacitors by switching; a first disconnector connected between one end of the leg and ground; a second disconnector connected between the other end of the leg and ground; and a disconnection signal generation unit that supplies a disconnection signal to the first disconnector and the second disconnector. Each of the unit converters includes a first resistor and a second resistor connected in series to the first resistor. The capacitor is connected in parallel to a series connection body of the first resistor and the second resistor. After the power converter is stopped, the disconnection signal generation unit causes the first disconnector and the second disconnector to be conducted by the disconnection signal.".

CITATION LIST

Patent Literature

PTL 1: JP 2004-357436 A
PTL 2: JP 2018-170832 A

SUMMARY OF INVENTION

Technical Problem

Incidentally, there is a demand in the above-described technology for more appropriately configuring the power converter device.

The present invention has been made in view of the above circumstances, and an object thereof is to provide a power converter device that can be appropriately configured.

Solution to Problem

In order to solve the above problems, a power converter device of the present invention includes: a plurality of power conversion units, each including a pair of AC terminals, a pair of DC terminals, and a power conversion circuit that performs power conversion in one direction or in both directions between the AC terminals and the DC terminals, the plurality of power conversion units being arranged along a first direction and a second direction different from the first direction; AC wiring that connects the AC terminals of the plurality of power conversion circuits in series along the second direction with respect to each phase of three-phase AC; and DC wiring that connects the DC terminals of the plurality of power conversion circuits in parallel along the first direction.

Advantageous Effects of Invention

According to the present invention, a power converter device can be appropriately configured.

BRIEF DESCRIPTION OF DRAWINGS

FIG. 1 is a diagram illustrating a circuit configuration of a power conversion unit applied to a first embodiment.

FIG. 2 is a schematic perspective view of the power conversion unit as viewed from the front side.

FIG. 3 is a schematic perspective view of the power conversion unit as viewed from the back side.

FIG. 4 is a schematic perspective view of a power converter device according to the first embodiment as viewed from the front side.

FIG. 5 is a schematic perspective view of the power converter device as viewed from the back side.

FIG. 6 is a schematic perspective view of a power conversion unit applied to a second embodiment as viewed from the front side.

FIG. 7 is a schematic perspective view of a power converter device according to the second embodiment as viewed from the front side.

DESCRIPTION OF EMBODIMENTS

Conditions of Embodiments

Power converters are used in various industrial fields for the purpose of effective use of electric energy. In these power converters, power converters with multi-level input/output are used from the viewpoint of coping with higher voltages, suppressing harmonics generated at the time of power conversion, and cost reduction by using less expensive low-voltage elements.

For example, it is considered that by applying the technique of PTL 1 described above, a converter that facilitates downsizing and assembling of a motor drive device of multi-level output can be configured. In this configuration, it is possible for a power converter having a motor drive function including a multiple transformer that receives high-voltage three-phase AC power and outputs a plurality of low-voltage three-phase AC, and a unit that receives low-voltage three-phase AC output from the multiple transformer and outputs single-phase AC power, to output high-voltage three-phase AC power by connecting single-phase output terminals of the units in series. In this configuration, it is considered that a multi-level output power converter that is compact and easy to assemble can be provided by linearly arranging the units connected in series to each phase to be output.

In addition, it is considered that when the technology of PTL 2 described above is applied, a circuit that quickly discharges a capacitor built inside can be configured in a power converter of a modular multilevel converter (MMC) that converts power from high-voltage AC to high-voltage DC. In general, in an MMC, a converter is configured by taking high-voltage three-phase power as input and output, and connecting units having a single-phase AC input/output terminal in each phase in series. In this converter, input/output voltages of a plurality of power converters connected in series to respective phases are appropriately controlled in accordance with the phase of the input AC. With this, the high-voltage three-phase AC power can be converted into high-voltage DC power. Also in this MMC, it is considered that the units are arranged on a straight line in each phase.

Meanwhile, in recent years, development of devices that convert power between high-voltage three-phase AC and low-voltage DC, such as a Solod State Transformer (SST), has been advanced. The SST type power converter is often configured a unit having a using single-phase AC input/output terminal and a DC input/output terminal. PTLs 1 and 2 described above do not particularly describe a preferable configuration applied to this type of SST type power converter. Thus, embodiments described later relates to a power converter that converts power between a high-voltage three-phase AC and a low-voltage DC, wherein an input/output power on a low-voltage DC side is stabilized, the power converter is downsized, and necessary wiring members are reduced.

First Embodiment

Configuration of First Embodiment

FIG. 1 is a diagram illustrating a circuit configuration of a power conversion unit 10 applied to a first embodiment.

In FIG. 1, the power conversion unit 10 includes an AC/DC conversion circuit 11 (power conversion circuit), a DC/DC conversion circuit 12 (power conversion circuit), a pair of AC terminals 14A and 14B, and a pair of DC terminals 16P and 16N. In the following description, the power conversion unit 10 may be simply referred to as "unit". Further, the AC/DC conversion circuit 11 and the DC/DC conversion circuit 12 may be simply referred to as "circuits". In addition, the AC terminals 14A and 14B and the DC terminals 16P and 16N may be simply referred to as "terminals".

When a power flow is directed from the terminals 14A and 14B to the terminals 16P and 16N, the AC/DC conversion circuit 11 converts the single-phase AC power supplied from the terminals 14A and 14B into DC power and supplies the converted DC power to the DC/DC conversion circuit 12. In addition, the DC/DC conversion circuit 12 steps down the DC voltage supplied from the AC/DC conversion circuit 11 and outputs the stepped-down DC voltage from the DC terminals 16P and 16N. Conversely, when the power flow is from the terminals 16P and 16N to the terminals 14A and 14B, the circuit 12 boosts the DC power input from the terminals 16P and 16N and supplies the boosted DC power to the circuit 11. In addition, the circuit 11 converts the supplied DC power into AC power and outputs the converted AC power from the terminals 14A and 14B.

The DC/DC conversion circuit 12 is an insulation type converting circuit. That is, although not illustrated, the DC/DC conversion an isolation circuit 12 includes transformer and bridge circuits connected to a primary side and a secondary side thereof. These bridge circuits function as inverters or synchronous rectifier circuits according to the direction of the power flow.

FIG. 2 is a schematic perspective view of the power conversion unit 10 as viewed from the front side.

In FIG. 2, an X axis (first direction), a Y axis (second direction), and a Z axis are axes orthogonal to each other, and the X axis is a horizontal direction, the Y axis is a vertical direction, and the Z axis is a depth direction, for example. The unit 10 is formed in a substantially rectangular parallelepiped shape, and a front plate 22 (first surface) is configured in a substantially rectangular plate shape. The AC terminals 14A and 14B are arranged on the front plate 22 along the Y-axis direction.

FIG. 3 is a schematic perspective view of the power conversion unit 10 as viewed from the back side.

A back plate 24 (second surface) of the unit 10 is also configured in a substantially rectangular plate shape. The DC terminals 16P and 16N are similarly arranged on the back plate 24 along the Y-axis direction.

FIG. 4 is a schematic perspective view of a power converter device 100 according to the first embodiment as viewed from the front side.

The power converter device 100 includes a plurality of units 10. These units 10 are two-dimensionally arranged along the X-axis direction and the Y-axis direction. In the illustrated example, the power converter device 100 includes total 12 units 10 in 3 rows in the X-axis direction and 4 rows in the Y-axis direction. The positions of these units 10 are expressed in a format of "4xy". Here, x is a coordinate value (1, 2, or 3) in the X-axis direction, and y is a coordinate value (1, 2, 3, or 4) in the Y-axis direction.

At uppermost end positions 414, 424, and 434 of the terminals 14A of the units 10, wirings 401, 402, and 403 are connected, respectively. In the present specification, the "wirings" includes cables with coating, cables without coating, bus bars, and the like. In the illustrated example, the wirings 401, 402, and 403 are U-phase, V-phase, and W-phase wirings of a three-phase power system. At lowermost positions 411, 421, and 431 of the terminals 14B of the units 10, a wiring 404 constituting a neutral point is connected. In addition, total nine (3×3) wirings 406 are provided between the wirings 401, 402, and 403 and the wiring 404. These wirings 406 connect the terminal 14B on the upper stage side (for example, at the position 434) and the terminal 14A on the lower stage side (for example, at the position 433).

Thus, the units 10 at the positions 411-414 are connected in series between the U-phase wiring 401 and the neutral point wiring 404 via the terminals 14A and 14B provided on the front plate 22. Similarly, the units 10 at the positions 421-424 are connected in series between the V-phase wiring 402 and the neutral point wiring 404 via the terminals 14A and 14B provided on the front plate 22. Similarly, the units 10 at the positions 431-434 are connected in series between the W-phase wiring 403 and the neutral point wiring 404 via the terminals 14A and 14B provided on the front plate 22. The above-described wirings 401-406 may be collectively referred to as "AC wirings 40".

FIG. 5 is a schematic perspective view of the power converter device 100 as viewed from the back side.

In FIG. 5, the units 10 at the lowermost positions 411, 421, and 431 are respectively connected to the U-phase, V-phase, and W-phase wirings 406 on the front plate 22 (see FIG. 4) as described above. As shown in FIG. 5, in these units 10, the terminals 16P on a positive side provided on the back plate 24 are connected to wiring 51P, and the terminals 16N on a negative side are connected to wiring 51N. Similarly, the unit 10 at the second lowermost positions 412, 422, and 432 are respectively connected to the U-phase, V-phase, and W-phase wirings 406 (see FIG. 4). In these units 10, the terminals 16P on the positive side provided on the back plate 24 are connected to wiring 52P, and the terminals 16N on the negative side are connected to wiring 52N.

Similarly, the unit 10 at the third lowermost positions 413, 423, and 433 are respectively connected to the U-phase, V-phase, and W-phase wirings 406 (see FIG. 4). In these units 10, the terminals 16P on the positive side provided on the back plate 24 are connected to wiring 53P, and the terminals 16N on the negative side are connected to wiring 53N. Similarly, the unit 10 at the uppermost positions 414, 424, and 434 are respectively connected to the U-phase, V-phase, and W-phase wirings 406 (see FIG. 4). In these units 10, the terminals 16P on the positive side provided on the back plate 24 are connected to wiring 54P, and the terminals 16N on the negative side are connected to wiring 54N. The wirings 51P to 54P and 51N to 54N described above may be collectively referred to as "DC wiring 50".

In the examples illustrated in FIGS. 4 and 5, the number of stages of the units 10 connected in series the U, V, and W phases is "4", but the number of stages of the units 10 is not limited to "4". Further, in the examples described above, the AC terminals 14A and 14B are disposed on the front plate 22 of each unit 10, and the DC terminals 16P and 16N are disposed on the back plate 24. However, the surface on which the terminals 16P and 16N are arranged may be a surface different from the surface on which the terminals 14A and 14B are arranged, and is not limited to the above examples.

Second Embodiment

Configuration of Second Embodiment

Next, a second embodiment will be described. In the following description, portions corresponding to the portions of the first embodiment described above are respectively denoted by the same reference numerals, and descriptions thereof may be omitted.

FIG. 6 is a schematic perspective view of a power conversion unit 30 applied to the second embodiment as viewed from the front side.

A circuit configuration of the power conversion unit 30 is similar to that of the power conversion unit 10 of the first embodiment (see FIG. 1). However, as illustrated in FIG. 6, an appearance of the power conversion unit 30 is different from that in the first embodiment.

In FIG. 6, the unit 30 is formed in a substantially rectangular parallelepiped shape, and a front plate 32 (common surface) is configured in a substantially rectangular plate shape. The AC terminals 14A and 14B are arranged on the front plate 32 along the Y-axis direction. The DC terminals 16P and 16N are similarly arranged on the front plate 32 along the Y-axis direction.

FIG. 7 is a schematic perspective view of a power converter device 200 according to the second embodiment as viewed from the front side.

The power converter device 200 includes a plurality of units 30. These units 30 are two-dimensionally arranged along the X-axis direction and the Y-axis direction. That is, in the illustrated example, similarly to the first embodiment (see FIG. 4), total 12 units 30 are provided in 3 rows in the X-axis direction and 4 rows in the Y-axis direction. Similarly to the first embodiment, the positions of these units 30 are also expressed in the format of "4xy".

The AC wirings 40, that is, the wirings 401, 402, 403, 404, and 406, are connected to the AC terminals 14A and 14B of each of the units 30. A state of the connection of these AC wirings 40 is the same as that of the first embodiment. DC wirings 50 are connected to the DC terminals 16P and 16N of each of the units 30. These DC wirings 50 are configured similarly to those in the first embodiment except that they are provided on the front plate 32.

In the example illustrated in FIG. 7, the AC terminals 14A and 14B and the DC terminals 16P and 16N are arranged on the front plate 32 of each unit 30, but the arrangement relationship of these terminals is not limited to that of the illustrated example. That is, the terminals 14A, 14B, 16P, and 16N may be provided on the same surface of the unit 30 other than the front plate 32.

Effects of Embodiments

As described above, according to the above-described embodiments, the power converter device 100 or 200 includes the plurality of power conversion units 10 or 30, each including the pair of AC terminals 14A and 14B, the pair of DC terminals 16P and 16N, and the power conversion circuit (11, 12) that performs power conversion in one direction or in both directions between the AC terminals 14A and 14B and the DC terminals 16P and 16N, the plurality of power conversion units 10 or 30 being arranged along the first direction (X) and the second direction (Y) different from the first direction (X), the AC wiring 40 that connects the AC terminals 14A and 14B of the plurality of power conversion units 10 or 30 in series along the second direction (Y) with respect to each phase of three-phase AC, and the DC wiring 50 that connects the DC terminals 16P and 16N of the plurality of power conversion units 10 or 30 in parallel along the first direction (X).

As a result, according to the embodiments, the power converter device 100 or 200 can be appropriately configured.

First, in the power converter device 100 or 200, since the DC terminals 16P and 16N of the units 10 or 30 corresponding to different phases are connected in parallel, the stability of input/output power can be increased. For example, in FIG. 5, it is assumed that consumed current of a load device (not illustrated) connected to the wirings 52P and 52N rapidly increases. In this case, since the output current of the units 10 at the position 412 (U phase), the position 422 (V phase), and the position 423 (W phase) rise substantially equally, current imbalance in the AC wirings 40 due to the rapid increase power consumption is less likely to occur.

Further, as illustrated in FIGS. 4, 5, and 7, the AC wirings 40 and the DC wirings 50 connecting the units 10 or 30 can be made extremely short. As a result, the power converter device 100 can be downsized, and wiring cost can be reduced. In addition, in a case where bus bars are adopted as the AC wirings 40 and the DC wirings 50, since each bus bar can be linearly formed, there is an advantage that processing of the bus bar is facilitated.

Furthermore, in the power converter device 100 according to the first embodiment, the plurality of power conversion units 10 have a plurality of surfaces, the pair of AC terminals 14A and 14B are mounted on the first surface (22), and the pair of DC terminals 16P and 16N are mounted on the second surface (24) different from the first surface (22). As a result, a long distance can be secured between the AC wirings 40 and the DC wirings 50, and noise or the like superimposed on the DC wirings 50 by the AC wirings 40 can be suppressed.

Moreover, in the power converter device 200 according to the second embodiment, the plurality of power conversion units 30 have a plurality of surfaces, and the pair of AC terminals 14A and 14B and the pair of DC terminals 16P and 16N are mounted on the common surface (32). As a result, the housing of the power conversion unit 30 can be easily opened and closed at a place other than the common surface (32), and maintainability of the power converter device 200 can be improved.

Modifications

The present invention is not limited to the above-described embodiments, and various modifications are possible. The above-described embodiments have been shown as examples in order to describe the present invention in an easy-to-understand manner, and are not necessarily intended to limit to those having all of the described configurations. Furthermore, a part of a configuration of one embodiment can be replaced with a configuration of another embodiment, and a configuration of one embodiment can be added to a configuration of another embodiment. Moreover, a part of the configuration of the embodiments can be deleted, or another configuration can be added or replaced. In addition, control lines and information lines that are considered to be necessary for the description are illustrated, and all of the control lines and the information lines on the product are not necessarily shown. In practice, it can be considered that almost all the configurations are connected to each other. Possible modifications to the above embodiments are, for example, as follows.

(1) In the above embodiments, the power conversion units 10 and 30 perform power conversion in both directions between the AC terminals 14A and 14B and the DC terminals 16P and 16N. However, the power conversion units 10 and 30 may perform power conversion in one direction.

(2) In the first embodiment, the first surface (22) and the second surface (24) are arranged to face each other, but the first surface (22) and the second surface (24) may not necessarily be arranged to face each other. For example, the first surface (22) and the second surface (24) may be disposed adjacent to each other.

REFERENCE SIGNS LIST

10, 30 power conversion unit
11 AC/DC conversion circuit (power conversion circuit)
12 DC/DC conversion circuit (power conversion circuit)
14A, 14B AC terminal
16P, 16N DC terminal
22 front plate (first surface)
24 back plate (second surface)
32 front plate (common surface)
40 AC wiring
50 DC wiring
100, 200 power converter device
X axis (first direction)
Y axis (second direction)

The invention claimed is:

1. A power converter device comprising: a plurality of power conversion units, each including a pair of AC terminals, a pair of DC terminals, and a power conversion circuit that performs power conversion in one direction or in both directions between the AC terminals and the DC terminals, the plurality of power conversion units being arranged along a first direction and a second direction different from the first direction; AC wiring that connects the AC terminals of the plurality of power conversion units in series along the second direction with respect to each phase of three-phase AC; and DC wiring that connects the DC terminals of the plurality of power conversion units in parallel along the first direction, wherein each of the plurality of power conversion units includes a plurality of surfaces, and wherein the pair of AC terminals are mounted on a first surface, and the pair of DC terminals are mounted on a second surface different from the first surface, wherein the pair of AC terminal and the pair of DC terminal are mounted in a first direction.

* * * * *